United States Patent [19]

Horn

[11] Patent Number: 4,905,939
[45] Date of Patent: Mar. 6, 1990

[54] SEWER HOSE SUPPORTER

[76] Inventor: Chris C. Horn, HCO 1 Box 16, Niland, Calif. 92257-9705

[21] Appl. No.: 377,626

[22] Filed: Jul. 10, 1989

[51] Int. Cl.⁴ ............................................. F16L 3/00
[52] U.S. Cl. ...................................... 248/49; 248/75; 138/106
[58] Field of Search ................... 248/49, 65, 74.1, 75, 248/76, 80, 83, 150, 152, 222.2, 222.3, 328; 4/321, 323; 193/2 A, 25 R, 25 E; 285/402, 403; 138/106, 107, 109, 120; 403/348, 300, 353, 375

[56] References Cited

U.S. PATENT DOCUMENTS

| 261,473 | 7/1882 | Naughten | 285/402 |
| 604,019 | 5/1898 | Carroll | 285/401 |
| 862,007 | 7/1907 | McGhie | 285/401 |
| 1,936,079 | 11/1933 | Belding | 248/65 |
| 3,730,228 | 5/1973 | Gibbs, Sr. | 248/49 |
| 3,810,490 | 5/1974 | Ludwick | 138/106 |
| 4,194,711 | 3/1980 | Winton | 248/49 |
| 4,223,702 | 9/1980 | Cook | 138/106 |
| 4,228,978 | 10/1980 | Rand | 248/49 |
| 4,403,758 | 9/1983 | Burt | 248/49 |

Primary Examiner—Ramon O. Ramirez
Assistant Examiner—Robert A. Olson

[57] ABSTRACT

Identical metal trough sections adapted for twist-lock attachment end to end. The twist-lock arrangement is built into the trough sections. No separate fasteners are required. The attached trough sections produce a half-round elongated member. The elongated member is useful for supporting and protecting expandible flexible sewer hose of the type normally used on motor homes and trailers for emptying holding tanks. After use, the elongated support member can be disassembled back into the smaller trough sections for storage.

3 Claims, 4 Drawing Sheets

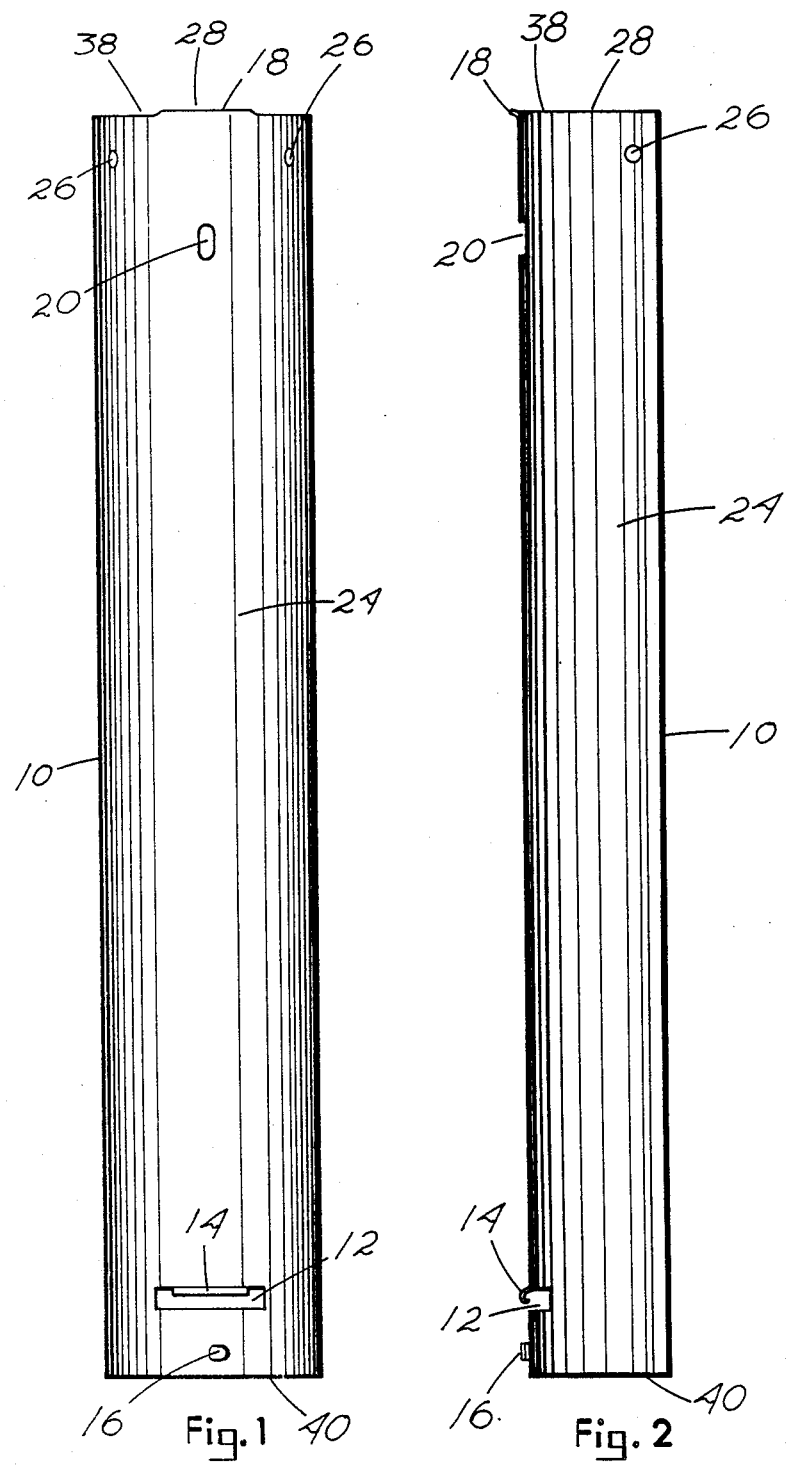

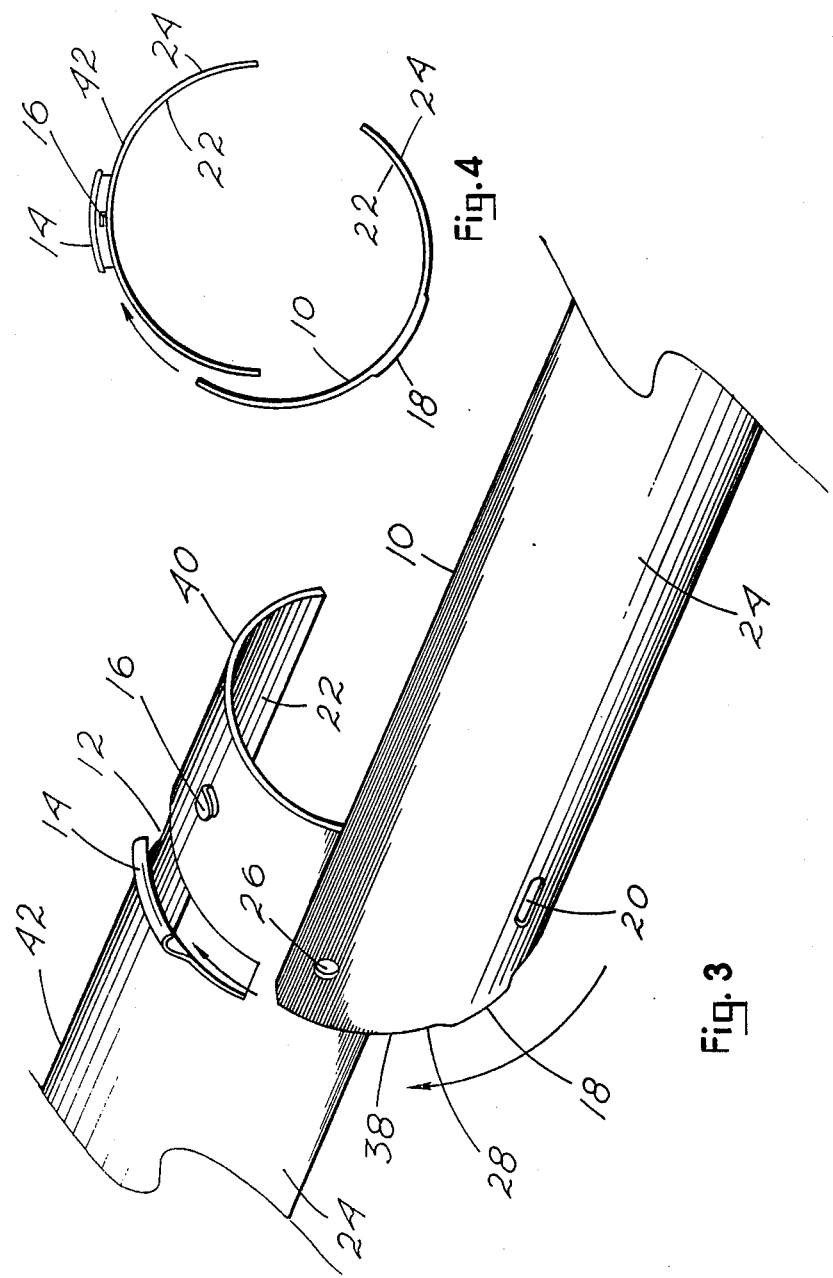

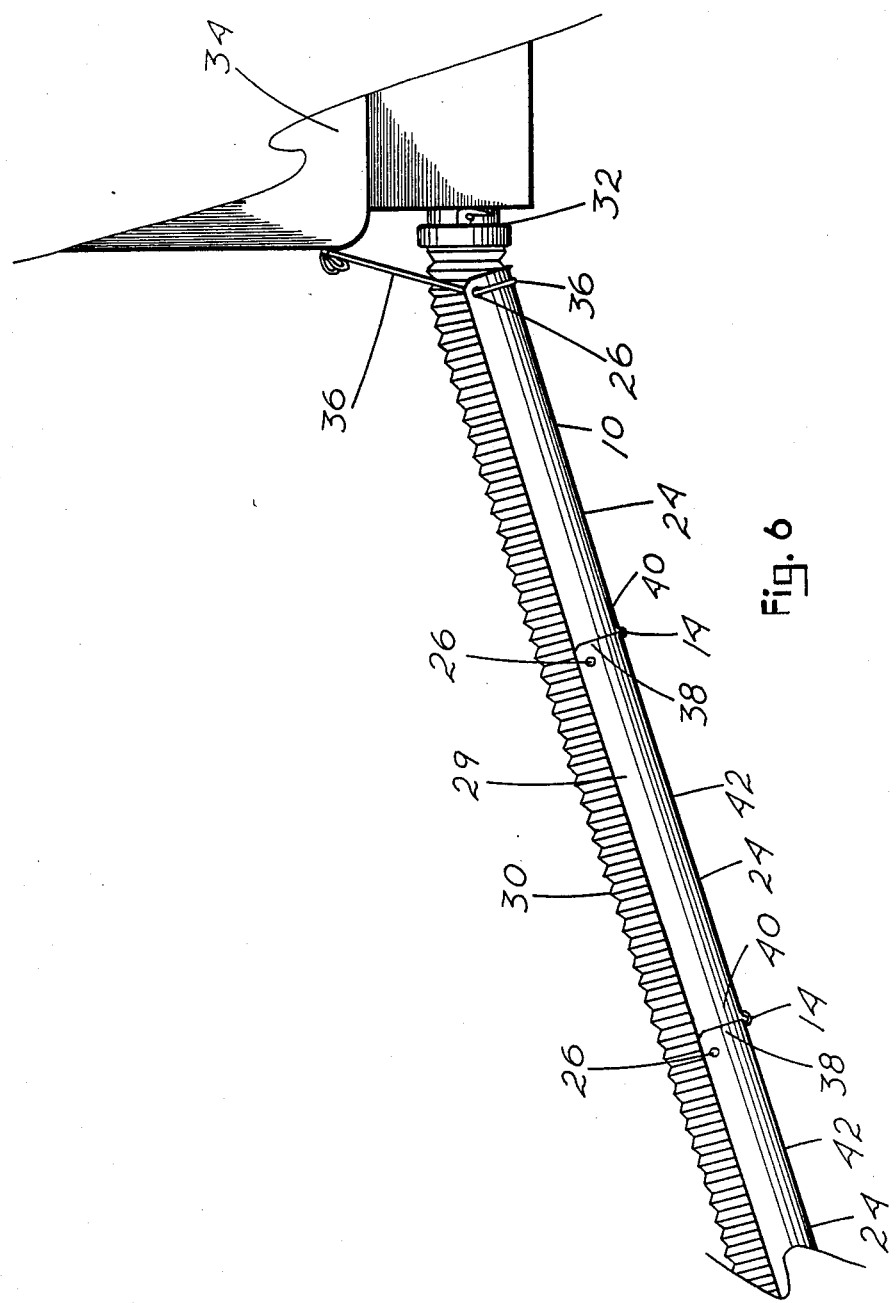

SEWER HOSE SUPPORTER

BACKGROUND OF THE INVENTION

1. Field of the Invention

This invention relates to equipment used for supporting sewer drain hoses during draining of trailer or motor home holding tanks into sewer inlets and other drainage facilities. The present invention relates more precisely to a system of one-piece interlockable trough sections designed to support the sewer hose off the ground during RV holding tank draining.

2. Description of the Prior Art

Many motor homes and other self-contained recreational vehicles have toilet facility holding tanks which must be periodically emptied into a designated dumping station or sewer inlet. Expandable, flexible plastic sewer hose is commonly used to provide a drainage line from the RV holding tank outlet to the sewer inlet. This type of hose is convenient for the traveler since it is collapsible for easy storage and it can expand and adjust to variations in distance between the vehicle holding tank outlet and the sewer inlet. There are, however, some disadvantages to using flexible sewer hose which is expandable. The material normally used in the manufacture of this type sewer hose is susceptible to nicks and tears from rocks and other sharp objects lying on the ground. Also, when the vehicle holding tank is drained, the excessive weight of the waste water passing through the sewer attachment hose can weigh the sewer hose down, causing it to stretch. The drain hose is especially susceptible to stretching near the holding tank drain outlet of the vehicle, where there is a sharp drop from the drainage outlet to ground level. Excess weight at this point can also cause the hose to disconnect from the adapter fitting attached to the tank drainage outlet, as this attachment is generally just a friction fit. Also, if the ground is not level at the dumping station site, some of the holding tank contents may remain in the lower levels of the sewer hose making it necessary to manipulate it to complete evacuation.

Rigid sections of plastic sewer hose are available, but the obvious disadvantages of storage and limited adjustability make their use impractical. Devices structured for supporting RV drainage hoses are not readily available in the market place and many RV owners try wooden blocks for the purpose.

SUMMARY OF THE INVENTION

In practicing my invention, I provide half-round short trough sections with a simple attachment feature for interlocking two or more identical trough sections together. The attachment structuring allows releasably connecting multiples of the short trough sections end to end to produce a single extended trough in a required length for supporting a sewer hose. Each trough section is structured of thin but rigid half-round sheet metal. Each trough section being identical and made of sheet metal allows for a single die stamp tool to be used for stamping the trough sections out of flat sheet metal. The locking structure used with the trough is an intrinsic part of the sheet metal of each trough section. The intrinsic locking structure eliminates the need for secondary manufacturing steps or the addition of extra parts both of which would add significantly to the manufacturing cost of the item. My sewer hose trough sections are die stamped coming out of the die stamp machine completed, and therefor can be manufactured quite inexpensively.

Although I prefer trough sections of the same length, the trough sections of this invention can be provided in different lengths to produce a long sectional trough close to a specific length. One end of each short trough section is adapted for releasable connection to the opposite end of a second short trough section. Several short trough sections can be endwardly connected to one another to form one long extended trough. The attached trough sections are placed under the sewer hose during use half encasing the sewer hose in the half-rounded extended trough. The end of the extended trough near the RV holding tank outlet is supported by a tether which is a cord passed through apertures provided in one end of each trough section. The tether cord is tied to the valve attachment fittings above the holding tank outlet or to a tie fixture attached to the RV wall surface. Tightening the tether cord supports the upper end of the sewer hose elevated while the entire length of the sewer hose is supported by rigidity in the trough structure with the lower end resting on the sewer inlet lip or on the ground.

Therefore, it is a primary object of my invention to provide a support which protects a sewer hose from damage while an RV holding tank is being drained.

A further object of my invention is to provide a support trough for an RV sewer hose with the trough being made of die stamped sheet metal being interlockable end to end with a locking structure which is intrinsic to the die stamped metal trough sections.

Another object of my invention is to provide a sewer hose support which is adjustable to accommodate various lengths of hose.

A further object of my invention is to provide a sewer hose support which can be disassembled into small easy to stack and to store separate units.

An even further object of my invention is to provide a sewer hose support structured in short easy to asemble and disassemble sections which are self-locking requiring no nuts and bolts to become easily misplaced.

A still further object of my invention is to provide a sewer hose support which eliminates the problem of waste residue inside the sewer hose when sections of the hose sag below the elevation of the sewer inlet.

Other objects and the many advantages of my invention will be revealed through a further reading of my specification and comparing described numbered parts therein with the same parts similarly numbered and illustrated in the drawings.

BRIEF DESCRIPTION OF THE DRAWINGS

FIG. 1 is a view of an outwardly rounded exterior side of a short trough section according to the invention.

FIG. 2 is a right side view thereof.

FIG. 3 illustrates one end of one short trough section positioned for twist-lock attachment to the opposite end a second short trough section.

FIG. 4 is an end view of FIG. 3.

FIG. 6 illustrates three sections of interlocking troughs in use supporting a sewer hose attached for draining an RV holding tank. The attached duplicate troughs as shown are supported by a tether cord fastened to the side of the vehicle.

DESCRIPTION OF THE PREFERRED EMBODIMENT

Figure 5:
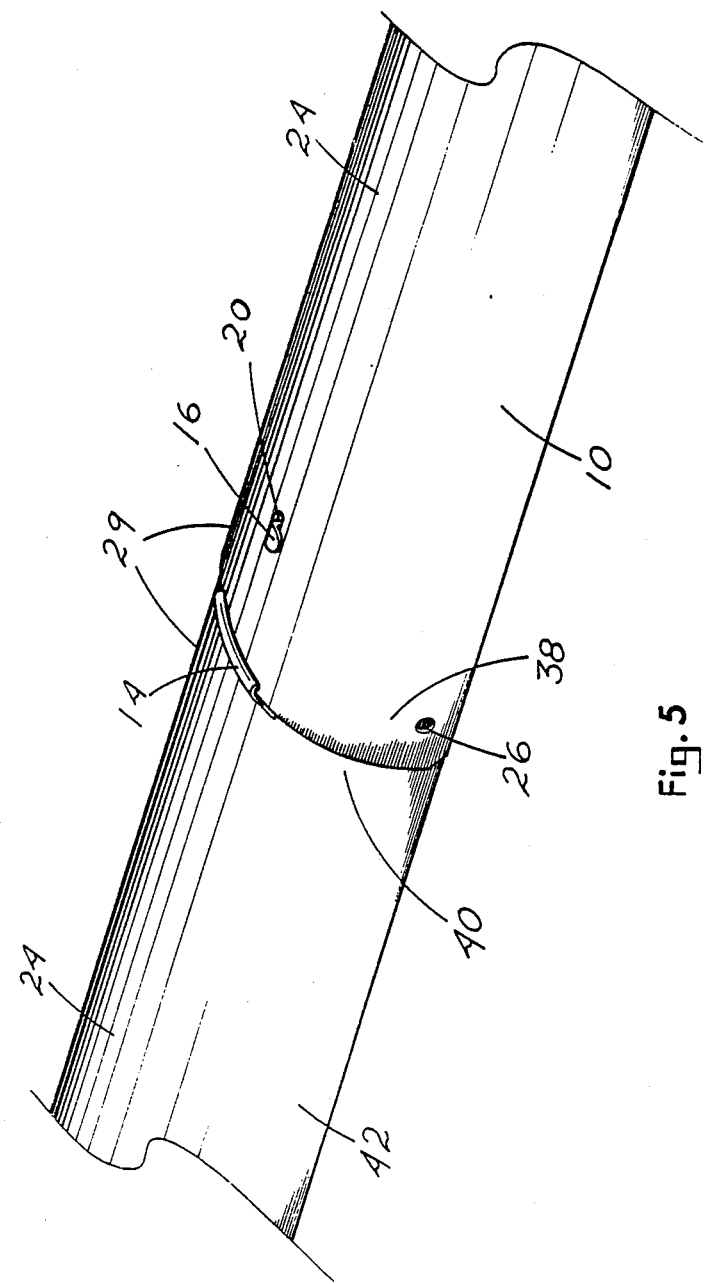
FIG. 5 is a perspective view of two attached short trough sections according to the invention viewed from the outwardly rounded exterior side.

Referring now to the drawings where the preferred embodiment is illustrated as an assemblage of interlocking separate trough sections 10, with each trough section 10 being identical in structure and function. Thus the principal invention, trough section 10, is a one-piece metal trough section longitudinally half rounded having an inwardly curved surface 22 and an outwardly curved surface 24 and having connectable ends. For descriptive purposes, the connectable ends are designated first longitudinal end 38 and second longitudinal end 40. See FIGS. 1 and 2. The connectable ends allow multiple duplicates 42 of trough section 10 to be connected end to end to produce a single support member 29 adjustable in length for a sewer hose 30. See FIGS. 5 and 6. Although duplicates 42 of trough section 10 could vary in length to produce a specifically measured single support member 29, the usefulness of single support member 29 is not effected when all duplicates 42 of trough sections 10 are equal in length. To make the connection, adjacent one end of each half round trough section 10 is a narrow transverse rectangular slot 12 provided along one longitudinal inner edge With a short protruding outwardly curved lip-like flange, locking lip 14. Locking lip 14 projects from the edge of rectangular slot 12 transversely to trough section 10 on the outwardly curved surface 24 of trough section 10. For instructional simplicity, each trough section 10 has a designated attachment end, attachment end 28. Aligning several trough sections 10 for attachment is easily accomplished by positioning all attachment ends 28 in a line away from each other. To fasten two lengths of trough sections 10 together, a flange 18 is provided at the end of each trough section 10 opposite the end in which rectangular slot 12 is cut. This flags the designated attachment end, attachment end 28. Flange 18 slips inside of locking lip 14 and the end locks inside of the curved lip of locking lip 14 when two trough sections 10 are twisted together with flange 18 and locking lip 14 aligned for attachment. See illustrations of the twist method of attaching two trough sections 10 together in FIGS. 3 and 4. To provide leverage locking, between rectangular slot 12 on the opposite side of locking lip 14 is a rounded tab, locking tab 16, raised in the outwardly curved surface 24 of trough section 10. Locking tab 16 has a short support base end and is angled over with a major rounded end portion paralleling the outwardly curved surface 24 of trough section 10. Locking tab 16 is positioned to snap into locking tab aperture 20 which is in the end of trough section 10 adjacent the flange 18 end. As illustrated in FIGS. 3 and 4, when the two trough sections 10 are twisted together with locking lip 14 and flange 18 interlocked, locking tab 16 slides into locking tab aperture 20 and lever locks the trough sections 10 together until untwisting releases them. See FIG. 5. Although, as illustrated in FIGS. 3 and 4, a clockwise twist locks trough sections 10 together and a counterclockwise twist unlocks the sections, trough sections 10 can be manufactured for locking and unlocking by twisting either direction. FIG. 5 shows two trough sections 10 locked together in a view from the bottom or outwardly curved surface 24. Locking lip 14 is over and retaining flange 18 and longitudinal separation is prevented by locking tab 16 slid into locking tab aperture 20 in a twist-locked position. The rounded upper flat surface of locking tab 16 is levered against the outwardly curved surface 24 of trough section 10 and the sections remain firmly locked until a reverse twist unlocks them.

FIG. 6 illustrates sewer hose 30 being supported by attached trough sections 10 formed into one long support member 29. Sewer hose 30 rests cradled in the inwardly curved surfaces 22 of the attached trough sections 10. Support member 29 is retained elevated adjacent holding tank outlet 32 by tether cord 36. Tether cord 36 passes through tether apertures 26 around under the end trough section 10 and is fastened to any protruding fixture usually available on vehicle 34 in a manner as shown to support the upper end of support member 29. Although not shown, the lower end of support member 29 rests against the ground or the edge of the sewer inlet platform so long as sufficient fall is provided for adequately draining the RV holding tank. When used as shown in FIG. 6, the present invention adequately supports and protects sewer hose 30 from ground damage and from sagging during use.

After use, with sewer hose 30 removed, a counterclockwise rotation of each trough section 10 will disengage flanges 18 from locking lips 14, and locking tab aperture 20 from locking tab 16. All disconnected trough sections 10 can be stacked one inside the other for compact storage, which saves the already limited available space in most RV's.

Although I have described my invention in detail in the previous specification, it would be obvious to one skilled in the art that it is possible to make alterations in the design of the attachment fittings or the structure of trough section 10 and still produce a sewer hose 30 support member 29 in a system having the same function as my invention. I therefore reserve the right to incorporate modifications in the structure and design of my device insofar as those changes remain within the scope of the appended claims and to claim as my invention the same restricted modifications made by others to my device.

What I claim as my invention is:

1. Attachable trough sections for supporting and protecting a sewer hose, comprising:

said trough sections made of generally thin-walled metal;

said trough sections formed generally longitudinally half rounded;

said trough sections having longitudinally a first terminal end and a second terminal end;

means for temporary interlocking said first terminal end of said trough sections to other identically structured said trough sections at said second terminal ends thereof with said temporary interlocking means being an intrinsic part of said trough sections adapting said trough sections for aligned attachment in multiples;

said temporary interlocking means including a slot affixed with a protruding lip transversely cut in each of said trough sections adjacent said second terminal end arranged for slide-over attachment and retainment of a flanged edge section at said first terminal end with said slide-over attachment accomplished by twisting said trough sections each oppositely while positioned with ends overlapping and an outwardly curved surface of one said trough section moved transversely over an inwardly curved surface of another said identically structured trough section with said lip and said flange aligned for said attachment, said means for temporary interlocking further including a protruding angled tab on said outwardly curved surface of said trough sections adjacent said second terminal ends adapted to slide through and lock over an edge of an aperture adjacent said first terminal ends of said trough sections during said twisting;

means for maintaining at least one of said troughs at one said terminal end elevated relative to an opposite said terminal end of said attachable trough sections when said attachable trough sections are fastened together.

2. The attachable trough sections defined in claim 1 wherein said means for maintaining at least one said trough terminal end elevated relative to an opposite said trough terminal end of said attachable trough sections when said attachable sections are fastened together includes a tether cord removably affixed through apertures in said first terminal end of said trough section with said tether cord arranged to pass around the outwardly curved surface of said trough section with loose ends free to tie around a temporary support.

3. Attachable trough sections for supporting and protecting a sewer hose, comprising:

said trough sections made of generally thin-walled metal;

said trough sections formed generally longitudinally half rounded;

said trough sections having longitudinally a first terminal end and a second terminal end;

means for temporary interlocking said first terminal end of said trough sections to other identically structured said trough sections at said second terminal ends thereof with said temporary interlocking means being an intrinsic part of said trough sections adapting said trough sections for aligned attachment in multiples;

said temporary interlocking means including a slot affixed with a protruding lip transversely cut in each of said trough sections adjacent said second terminal end arranged for slide-over attachment and retainment of a flanged edge section at said first terminal end with said slide-over attachment accomplished by twisting said trough sections each oppositely while positioned with ends overlapping and an outwardly curved surface of one said trough section moved transversely over an inwardly curved surface of another said identically structured trough section with said lip and said flange aligned for said attachment, said means for temporary interlocking further including a protruding angled tab on said outwardly curved surface of said trough sections adjacent said second terminal ends adapted to slide through and lock over an edge of an aperture adjacent said first terminal ends of said trough sections during said twisting.

* * * * *